United States Patent [19]

King et al.

[11] Patent Number: 5,696,210

[45] Date of Patent: Dec. 9, 1997

[54] FLOWABLE ADHESIVE

[75] Inventors: Russell Keith King; Chi-Long Lee, both of Midland, Mich.

[73] Assignee: Dow Corning Corporation, Midland, Mich.

[21] Appl. No.: 723,461

[22] Filed: Oct. 9, 1996

[51] Int. Cl.$^6$ ................................................ C08F 283/00
[52] U.S. Cl. ........................... 525/478; 525/479; 528/12; 528/15; 528/23; 528/24
[58] Field of Search ............................. 528/15, 23, 12, 528/24; 525/478, 479

[56] References Cited

U.S. PATENT DOCUMENTS

| | | | |
|---|---|---|---|
| 4,774,297 | 9/1988 | Murakami et al. | 525/478 |
| 4,988,779 | 1/1991 | Medford et al. | 525/478 |
| 5,169,727 | 12/1992 | Boardman | 428/447 |
| 5,292,586 | 3/1994 | Lin et al. | 428/355 |
| 5,342,870 | 8/1994 | Stein et al. | 525/478 |
| 5,380,812 | 1/1995 | Lutz et al. | 528/15 |
| 5,416,144 | 5/1995 | Stein et al. | 528/15 |
| 5,475,044 | 12/1995 | Stein et al. | 528/15 |

*Primary Examiner*—Melvyn I. Marquis
*Attorney, Agent, or Firm*—Sharon K. Severance

[57] ABSTRACT

This invention pertains to an addition-curable silicone adhesive composition that is extrudable and flowable at room temperature in the absence of a solvent comprising (A) 40 to 95 parts of an alkenyl functional siloxane resin consisting essentially of $R_3SiO_{1/2}$ siloxane units and $SiO_{4/2}$ siloxane units, wherein R is a monovalent hydrocarbon radical having 1 to 6 carbon atoms; there being from 0.5 to 1.5 $R_3SiO_{1/2}$ units for every $SiO_{4/2}$ units; said resin containing 0.01 to 22 wt % alkenyl functionality; (B) 0.5 to 10 parts of an SiH containing polyorganosiloxane having an average of at least 2 silicon-bonded hydrogen atoms per molecule and having a viscosity of 0.8 to 2,000 mm$^2$/s; (C) a hydrosilylation catalyst in sufficient quantity to promote curing of said composition; (D) optionally, up to 70 parts of a polydiorganosiloxane having at least two ethylenically or acetylenically unsaturated groups per molecule and having a viscosity of 100 to 80,000 mm$^2$/s; and (E) optionally, an inhibitor in sufficient quantity for the composition to be stable at room temperature in the absence of oxygen and SiH reactive hydroxylated compounds.

17 Claims, No Drawings

FLOWABLE ADHESIVE

BACKGROUND OF THE INVENTION

This invention relates to a solventless, addition-curable silicone adhesive composition that is flowable or extrudable at room temperature. The compositions first cure to a viscous, tacky state which have a high green strength but still allow adjustment or replacement of the adherands (i.e. a pressure sensitive adhesive), and thereafter slowly cure to yield a high strength, immovable bond (i.e. a permanent adhesive).

Various curable adhesives are known in the art. Some of these adhesives require the use of a solvent for application to a substrate since they are not flowable or extrudable at room temperature. For Example, U.S. Pat. No. 4,774,297 to Murakami et al. discloses a pressure sensitive adhesive forming composition comprising (A) an alkenyl functional polydiorganosiloxane having a viscosity of at least 500,000 cp; (B) an siloxane resin; (C) an SiH containing polyorganosiloxane having at least two SiH groups per molecule; (D) a platinum-containing catalyst and (E) an organic solvent.

Silicone pressure sensitive adhesive compositions that do not require the use of solvent for application to a substrate are also known in the art. However, these compositions do not provide the dual cure that is found in the compositions of the instant application. For example, U.S. Pat. No. 4,988,779 to Medford et al. discloses a silicone pressure sensitive adhesive composition comprising (a) an essentially vinyl-free benzene soluble resin copolymer; (b) a vinyl containing polydiorganosiloxane having a viscosity of 500 to 10,000 cp; (c) an SiH containing polyorganosiloxane; and (d) a platinum containing catalyst.

U.S. Pat. No. 5,169,727 discloses a pressure sensitive adhesive composition comprising (a) an essentially vinyl-free benzene soluble resin copolymer; (b) a vinyl containing polydiorganosiloxane; (c) an SiH containing polyorganosiloxane; (d) an organosilicon crosslinking agent; and (d) a hydrosilation catalyst.

U.S. Pat. No. 5,292,586 to Lin et al. discloses a solventless or low solvent containing silicone pressure sensitive adhesive comprising (a) an essentially vinyl-free benzene soluble resin copolymer; (b) a vinyl containing polydiorganosiloxane having a viscosity of 10 to 500 cp; (c) an SiH containing polyorganosiloxane having a viscosity of 10 to 1,000 cp; (d) an organosilicon crosslinking agent; and (d) a hydrosilation catalyst.

These prior art composition cure by a hydrosilylation reaction to a tacky silicone pressure sensitive adhesive and thereafter remain tacky.

It is an object of this invention to provide a solventless, addition-curable silicone adhesive composition that is flowable or extrudable at room temperature.

It is further an object of this invention to provide a solventless, addition-curable silicone adhesive composition that first cures to a viscous, tacky state which has a high green strength but still allows adjustment or replacement of the adherands (i.e. a pressure sensitive adhesive), and thereafter slowly cures to yield a high strength, immovable bond (i.e. a permanent adhesive).

SUMMARY OF THE INVENTION

The instant invention pertains to an addition-curable silicone adhesive composition that is extrudable and flowable at room temperature in the absence of a solvent. The compositions quickly cure to a viscous, tacky state which have a high green strength but still allow adjustment or replacement of the adherands (i.e. a pressure sensitive adhesive), and thereafter slowly cure to yield a high strength, immovable bond (i.e. a permanent adhesive). The solventless, addition-curable adhesive compositions comprise a mixture of (A) 40 to 95 parts of an alkenyl functional siloxane resin consisting essentially of $R_3SiO_{1/2}$ siloxane units and $SiO_{4/2}$ siloxane units, wherein each R is independently a monovalent hydrocarbon radical having 1 to 6 carbon atoms with the provision that at least one R be an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 10 parts of an SiH containing polyorganosiloxane having an average of at least 2 silicon-bonded hydrogen atoms per molecule and having a viscosity of 0.8 to 2,000 $mm^2/s$;

(C) a hydrosilylation catalyst in sufficient quantity to promote curing of said composition;

(D) optionally, 0.1 to 70 parts of a polydiorganosiloxane having at least two ethylenically or acetylenicaly unsaturated groups per molecule and having a viscosity of 100 to 80,000 $mm^2/s$; and (E) optionally, an inhibitor in sufficient quantity for the composition to be stable at room temperature;

wherein said adhesive composition has a viscosity of between 5 and 1,500 Pas in the absence of solvent and is flowable or extrudable 25° C.; and wherein said adhesive composition first cures to a composition having green strength and a movable bond and thereafter further cures to a composition having an immovable bond.

THE INVENTION

This invention pertains to a solventless addition-curable, room temperature extrudable or flowable adhesive composition. The adhesive composition first cures to an adhesive that exhibits a high green strength and provides for a movable bond. The adhesive composition further cures to an adhesive that has an immovable bond. The compositions comprise a mixture of (A) 40 to 95 parts of an alkenyl functional siloxane resin consisting essentially of $R_3SiO_{1/2}$ siloxane units and $SiO_{4/2}$ siloxane units, wherein each R is independently a monovalent hydrocarbon radical having 1 to 6 carbon atoms with the provision that at least one R be an alkenyl radical; there being from 0.5 to 1.5 $R_3SiO_{1/2}$ units for every $SiO_{4/2}$ units; said resin containing 0.01 to 22 wt % alkenyl functionality;

(B) 0.5 to 10 parts of an SiH containing polyorganosiloxane having an average of at least 2 silicon-bonded hydrogen atoms per molecule and having a viscosity of 0.8 to 2,000 $mm^2/s$;

(C) a hydrosilylation catalyst in sufficient quantity to promote curing of said composition;

(D) optionally, 0.1 to 70 parts of a polydiorganosiloxane having at least two ethylenically or acetylenicaly unsaturated groups per molecule and having a viscosity of 100 to 80,000 $mm^2/s$; and (E) optionally, an inhibitor in sufficient quantity for the composition to be stable at room temperature.

By the term "mixture" it is meant any blend or incipient reaction product of the listed components. Thus, upon combination with each other the components may remain in their form as added or they may incidentally react with another component to form a component not specifically identified in the listing.

The alkenyl functional siloxane resin consists essentially of $R_3SiO_{1/2}$ siloxane units (M units) and $SiO_{4/2}$ siloxane units (Q units); where R is a monovalent hydrocarbon groups having 1 to 6 carbon atoms. In addition to the $R_3SiO_{1/2}$ siloxane units and $SiO_{4/2}$ siloxane units the resins may contain $HOR_2SiO_{1/2}$ or $R^4OR_2SiO_{1/2}$ units and even some divalent and trivalent siloxane units, provided however, that these units are present only in small amounts; wherein $R^4$ is selected from the group consisting of an alkyl radical having 1 to 3 carbon atoms and an alkoxyalkyl radical. It is preferable that the resin consist essentially of $R_3SiO_{1/2}$ siloxane units and $SiO_{4/2}$ siloxane units.

R may be exemplified by alkyl radicals such as methyl or ethyl; the phenyl radical; and alkenyl radicals such as vinyl, allyl and hexenyl. Preferably R is selected from the group consisting of methyl and vinyl.

$R^4$ may be exemplified by, but not limited to methyl, ethyl, propyl, and others.

The siloxane resins useful in the instant invention typically contains 0.01 to 22 wt % alkenyl functionality, preferably 0.6 to 20 wt % alkenyl functionality, most preferably 0.6 to 8 wt %.

The mole ratio of the $R_3SiO_{1/2}$ siloxane units to $SiO_{4/2}$ siloxane units of in the resin has a value of from 0.5/1 to 1.5/1, preferably from 0.6/1 to 1.1/1. These mole ratios are easily measured by $^{29}Si$ NMR spectroscopy. It is also preferable that the presence of silicon-bonded hydroxyl groups (i.e. $HOR_2SiO_{1/2}$ or $HOSiO_{3/2}$ groups) is kept below 0.7% by weight of the total weight of the resin, preferably below 0.3%.

The siloxane resins can be dissolved, substantially completely, in either a hydrocarbon liquid such as benzene, toluene, xylene, heptane and the like or in a silicone liquid such as a low viscosity cyclic or linear polydiorganosiloxanes.

Alkenyl functional siloxane resins are well known in the art and can be prepared by known methods.

The SiH containing polyorganosiloxane has an average of at least 2 silicon-bonded hydrogen atoms per molecule and has a viscosity of 0.8 to 2,000 mm²/s preferably from 2 to 200 mm²/s. The organic groups on the silicon are selected from the group consisting of alkyl radicals having 1 to 4 carbon atoms and aryl radicals having from 6 to 10 carbon atoms. The organic groups may be exemplified by methyl, ethyl, and phenyl. Typically the SiH containing polyorganosiloxane contains from 0.01 to 2 wt % of hydrogen bonded to silicon, preferably from 0.1 to 1.7 wt %.

The amount of (B) present in the adhesive composition is sufficient to provide from 1 to 30 silicon bonded hydrogen atoms for every olefinically unsaturated radical in the total of (A) plus (D). Preferably there are from 1 to 10 silicon bonded hydrogen atoms for every olefinically unsaturated radical. Typically this requires 0.5 to 10 parts of the SiH containing polyorganosiloxane in the composition.

Component (B), may be exemplified by, but not limited to SiH containing polymethylhydrogensiloxanes, linear polymethylhydrogensiloxanes, branched polymethylhydrogensiloxanes, dimethylmethylhydrogensiloxane copolymers, cyclic polymethylhydrogensiloxanes and cyclic polydimethylmethylhydrogensiloxanes; resins comprised of $SiO_{4/2}$ units, $(CH_3)_3SiO_{1/2}$ units and units of $(CH_3)_2HSiO_{1/2}$, $(CH_3)HSiO_{2/2}$ and $(CH_3)_2SiO_{2/2}$, etc.; and mixtures thereof. The silicon-bonded hydrogen groups may be pendent or terminal.

Component (B) may be further exemplified by compounds having the formulas $R^2{}_3SiO(R^1{}_2SiO)_{1/2}(HR^1SiO)_nSiR^2{}_3$ $R^2{}_3SiO(R^2{}_2SiO)_pSiR^2{}_3$ $(R^1{}_2Si)_x(HR^1SiO)_y$ and $(R^2{}_3SiO_{1/2})_a(SiO_{4/2})_b(R^2{}_2SiO_{2/2})_c$ wherein each $R^1$ individually is a radical selected from the group consisting of alkyl radicals having from 1 to 6 carbon atoms and aryl radicals having from 6 to 10 carbons atoms; $R^2$ is selected from the group consisting of the hydrogen atom and $R^1$ with the proviso that at least two $R^2$ groups are hydrogen atoms. Subscripts m, n, p, s, t, a, b, and c are such that the viscosity is from 0.8 to 2,000 mm²/s and that, individually, n, p, t and a+c are $\geq 2$.

Hydrosilylation catalysts useful in the composition may be any of those catalysts known in the art that are effective for catalyzing the reaction between silicon bonded hydrogen atoms with silicon bonded unsaturated carbon groups (i.e. C=C groups). Such catalysts typically include, but are not limited to, metal catalysts wherein the metal is selected from the group consisting of ruthenium, rhodium, palladium, osmium, iridium and platinum. Preferably, the hydrosilylation catalyst is a platinum-containing catalyst. Suitable platinum containing catalysts are well known in the art and may be exemplified by, but not limited to, platinum metal, platinum compounds, and platinum complexes. The platinum compounds and platinum complexes may be exemplified by chloroplatinic acid, chloroplatinic acid hexahydrate, Karstedt's, dichloro-bis(triphenylphosphine)platinum (II), cis-dichloro-bis(acetonitrile)platinum(II), dicarbonyldichloro-platinum(II), platinum chloride, platinum oxide and others. Any platinum containing material which effects the reaction between the silicon hydride and the unsaturated portion of the unsaturated compound is useful in the instant invention.

The platinum containing catalyst is present in an amount sufficient to provide at least 0.1 to 1,000; preferably 1 to 500; most preferably 10 to 300 parts by weight of platinum for every one million parts by weight of the combined weight of (A), (B) and (D).

Component (D) is an optional component in the instant invention. Component (D) is an alkenyl functional polydiorganosiloxane having the general formula $R^1{}_2R^3SiO(R^3{}_2SiO)_kSiR^3R^1{}_2$ wherein each $R^1$ is as described above; each $R^3$ individually is selected from the group consisting of an alkenyl radical, an alkynyl radical and $R^1$ with the proviso that at least two $R^3$ radicals per molecule must be alkenyl or alkynyl; and k has a value such that the viscosity of (D) is from 100 to 80,000 mm²/s at 25° C., preferably from 9,000 to 55,000 mm²/s.

$R^1$ may be further exemplified by methyl, ethyl, propyl and phenyl. Preferably at least 50%, and more preferably 90%, of all $R^3$ groups should be methyl. $R^3$ may be exemplified by, but not limited to, vinyl, allyl, butenyl, hexenyl and others. Preferably $R^3$ is vinyl when $R^3$ is an unsaturated group.

Component (D) may be comprised of a single polydiorganosiloxane, a mixture of two or more polydiorganosiloxanes that meet the above formula, or a mixture of polydiorganosiloxanes wherein at least one meets the above formula for component (D).

The alkenyl functional polydiorganosiloxane may be exemplified by, but not limited to, $ViMe_2SiO(Me_2SiO)_xSiMe_2Vi$, $ViMe_2SiO(Me_2SiO)_x(MePhSiO)_ySiMe_2Vi$, $ViMe_2SiO(Me_2SiO)_x(MeViSiO)_zSiMe_2Vi$, $Me_3SiO(Me_2SiO)_x(MeViSiO)_zSiMe_3$, $PhMeViSiO(Me_2SiO)_xSiPhMeVi$, and others where Me, Vi, and Ph denote methyl, vinyl and phenyl respectively and subscripts x, y, and z are such that the polymer has a viscosity of from 100 to 80,000 mm²/s. The alkenyl functional polydiorganosiloxane typically contains from 0.01 to 15 wt % vinyl bonded to silicon, preferably from 0.05 to 0.5 wt % vinyl bonded to silicon.

Typically there is from 0.1 to 70 parts of the alkenyl functional polydiorganosiloxane present in the composition, preferably from 1 to 50 parts.

Component (E) is optional in the composition. Component (E) inhibits or reduces the catalytic activity of the hydrosilylation catalyst at 25° C. in the absence of oxygen and SiH-reactive hydroxylated compounds and/or in the absence of heat. Inhibitors useful in the instant invention are organophosphorus compounds such as triphenylphosphine; nitrogenous compounds such as tributylamine, tetramethylethylenediamine and benzotriazole; sulfur-containing compounds; acetylenic compounds; compounds bearing at least two alkenyl groups; hydroperoxy compounds; and maleic acid derivatives.

Preferred catalyst inhibitors include phosphines, phosphites, and phosphine oxides such as triphenyphosphine, trioctylphosphine, divinylphenyphosphine, tributylphosphine oxide, trioctylphosphine oxide and triphenylphosphine oxide which inhibit the catalytic activity of the hydrosilylation catalyst at 25° C. in the absence of oxygen and SiH-reactive hydroxylated compounds. These inhibitors are taught in U.S. Pat. No. 5,308,812, herein incorporated by reference for its teaching of these inhibitors.

The amount of inhibitor needed in the compositions is dependent on a number of factors including, but not limited to, the activity of the inhibitor and the activity of catalyst (C). Typically the molar ratio of catalyst inhibitor to metal present in catalyst (C) is within the range of from 1:1 to 200:1.

In addition to the components identified herein, there may be other components present in the composition of the instant invention so long as these components do not adversely affect the curing of the composition or the physical properties of the cured composition. Such additional components may be exemplified by, but not limited to, adhesion promoters, fillers, antioxidants, pigments, stabilizers and others.

The compositions may be prepared as one part or two part compositions. When the composition is a one part composition, the inhibitor (E) must be present in the composition. When the composition is a two part composition it is not necessary to add the inhibitor (E) to the composition so long as there is not present in a single part an unsaturated compound (i.e. (A) or (D)), an SiH containing compound (i.e. (B)) and catalyst (C).

One part compositions are prepared by combining together components (A), (B), (C), and optionally (D) in an environment essentially free of oxygen and SiH reactive hydroxylated compounds. To facilitate combining the components heat or a hydrocarbon solvent such as benzene, toluene, xylene, heptane may be used. If a hydrocarbon solvent is used to facilitate the combining of the components, the solvent is removed from the composition by stripping or other known methods. If heat is used it is preferable to heat the compositions to a temperature of 30° C. to 150° C. However, it should be noted heat should not be used when there is present an unsaturated compound (i.e. (A) or (D)), an SiH containing compound (i.e. (B)) and hydrosilylation catalyst (C). Once components (A), (B), (C) and optionally (D) have been combined, the inhibitor (E) is added and the final composition prepared.

The one part compositions should be stored in an environment essentially free of oxygen and SiH reactive hydroxylated compounds or heat depending upon the inhibitor used to prevent the initiation of the addition cure prior to use. Upon exposure to oxygen and/or SiH reactive hydroxylated compounds, the compositions will cure to an adhesive composition that exhibits a high green strength and provides for a movable bond and thereafter further cure to an adhesive that has an immovable bond.

The two part compositions are prepared by combining together the components in two or more parts and then combining together the various parts when use of the composition is desired. The parts may formulated in any desired means so long a there is not present in a single part an unsaturated compound (i.e. (A) or (D)), an SiH containing compound (i.e. (B)) and catalyst (C). When the two parts are mixed together the curing will begin and the adhesive composition will cure to an adhesive composition that exhibits a high green strength and provides for a movable bond and thereafter further cure to an adhesive that has an immovable bond. It is preferred to prepare the two part compositions by combining components (A), (B) and optionally (D) in the first part and combining components (A), (C) and optionally (D) in the second part.

To apply the two-part composition, the individual parts are mixed with an appropriate means to obtain a homogeneous mixture at a ratio such that there is present the SiH:Sialkenyl ratio to give the desired physical properties of the cured adhesive.

It is theorized that the first cure mechanism is essentially the reaction between components (B) and (D) while the second cure mechanism is essentially the reaction between components (A) and (B).

The compositions are applied to a substrate at room temperature by extruding or by pouring. The surface or substrate to which the adhesive compositions are applied may be any known solid material such as metal, paper, wood, leather, fabrics, plastics, silicone rubbers, concrete, brick, glass, and others. Following application to the substrate the compositions begin to cure to an adhesive that exhibits a high green strength and provides for a movable bond. Because the compositions quickly cure to this state, it is not necessary to heat the compositions to promote curing. In fact, it is not desirable to heat the compositions during the cure. Typically, the compositions will reach a tacky state having green strength within minutes of their application. The compositions will continue to cure until they have an immovable bond. This can occur within hours to days of application. Heat may be applied to facilitate this cure, although it is not necessary.

The compositions of this invention find utility in many of the same applications as now being served by silicone pressure sensitive adhesives, particularly in such industries as automotive, electronic, construction, space and medical. In these applications, the instant PSAs provide bonds which are resistant to hostile environments, such as heat and moisture.

So that those skilled in the art can understand and appreciate the invention taught herein, the following examples are presented, it being understood that these examples should not be used to limit the scope of this invention found in the claims attached hereto.

Preparation Example 1

Preparation of a Resin with a number average molecular weight (Mn) of 1500 and a number average vinyl functionality ($F_{vi}$) of 1.9.

A solution of 420.8 g of hexamethyldisiloxane, 107.48 g of 1,3-divinyl-1,1,3,3-tetramethyldisiloxane, 195.6 g of 36% hydrochloric acid, 293.4 g of water and 146.7 g of ethanol was vigorously stirred at 80° C. for an hour. To this was slowly added over one hour while vigorously stirring, 1220 g of tetraethylorthosilicate. Xylene (216.84 g) was added and the mixture was allowed to cool to room temperature. The xylene layer containing the siloxane resin was separated and washed with three 150 ml aliquots of water. It was then dried by azeotroping the xylene/water at 130 mm Hg. Residual silanol was removed by reacting this crude resin with 108.5 g of hexamethyldisilazane using 0.39 g of trifluoroacetic acid as catalyst for 8 hours at 70° C. The mixture was then stripped to a pot temperature of 150° C. at 2 mm Hg. The yield was 830.9 g of a resin with Mn of 1500 relative to MQ resin molecular weight standards. $^{29}$Si NMR indicated a $SiO_2/ROSiO_{3/2}/Me_3SiO_{1/2}/ViMe_2SiO_{1/2}$ ratios of 0.406/0.046/0.456/0.092 which corresponds to a $F_{Vi}$ of 1.9.

Preparation Example 2

Preparation of a resin with a $M_n$ of 3000 and a $F_{Vi}$ of 1.0.

956.5 g of a 66.9% xylene solution of a silanol functional MQ resin of approximately 2900 $M_n$ was dried azeotropically at atmospheric pressure. After cooling to 80° C., 22.82 g of 1,3-divinyl-1,1,3,3-tetramethyldisiloxane and 0.28 g of trifluoroacetic acid were added. The mixture was stirred at 80° C. for 3 hours and 99.31 g of hexamethyldisilazane was added and allowed to react for 8 hours. This was followed by adding 23.66 g of methanol, stirring at 80° C. for an hour, adding 25 g of sodium bicarbonate, and stirring while allowing to cool to room temperature. The mixture was stripped to a head temperature of 60° C. at 50 mm Hg to remove any methoxy triorganosilanes and other materials boiling less than xylene, and then filtered to yield a 76% solution of the resin in xylene. The resin had a Mn of 3000 and $^{29}$Si NMR indicated a $SiO_2/ROSiO_{3/2}/Me_3SiO_{1/2}/ViMe_2SiO_{1/2}$ ratio of 0.461/0.017/0.498/0.024 which corresponds to a $F_{Vi}$ of 1.0.

Preparation Example 3

Preparation of a resin with a $M_n$ of 3000 and a $F_{Vi}$ of 1.9.

936.9 g of a 66.9% xylene solution of a silanol functional MQ resin of approximately 2900 $M_n$ was dried azeotropically at atmospheric pressure. After cooling to 80° C., 44.70 g of 1,3-divinyl-1,1,3,3-tetramethyldisiloxane and 0.28 g of trifluoroacetic acid were added. The mixture was stirred at 80° C. for 3 hours and 77.82 g of hexamethyldisilazane was added and allowed to react for 8 hours. This was followed by adding 23.17 g of methanol, stirring at 80° C. for an hour, adding 25 g of sodium bicarbonate, and stirring while allowing to cool to room temperature. The mixture was stripped to a head temperature of 60° C. at 50 mm Hg to remove any methoxytriorganosilanes and other materials boiling less than xylene, and then filtered to yield a 66% solution of the resin in xylene. The resin had a Mn of 2987 and 29Si NMR indicated a $SiO_2/ROSiO_{3/2}/Me_3SiO_{1/2}/ViMe_2SiO_{1/2}$ ratios of 0.458/0.022/0.475/0.046 which corresponds to a $F_{Vi}$ of 1.9.

Preparation Example 4

Preparation of a resin with a $M_n$ of 2900 and a $F_{Vi}$ of 2.9.

1291.9 g of a 66.3% xylene solution of a silanol functional MQ resin of approximately 2900 $M_n$ was dried azeotropically at atmospheric pressure. After cooling to 70° C., 130.0 g of 1,3-divinyl-1,1,3,3-tetramethyldisiloxane and 1.18 g of trifluoroacetic acid were added. The mixture was stirred at 70° C. for 3 hours and 33.09 g of methanol was added. Stirring at 80° C. was continued for one hour, followed by adding 35 g of sodium bicarbonate, and stirring while allowing to cool to room temperature. The mixture was stripped to a head temperature of 60° C. at 50 mm Hg to remove any methoxytriorganosilanes and other materials boiling less than xylene, and then filtered to yield 1232 g of a 82.9% solution of the resin in xylene. The resin had a Mn of 2900 and $^{29}$Si NMR indicated a $SiO_2/ROSiO_{3/2}/Me_3SiO_{1/2}/ViMe_2SiO_{1/2}$ ratios of 0.447/0.027/0.455/0.071 which corresponds to a $F_{Vi}$ of 2.9.

EXAMPLE 1

All chemicals were deoxygenated and dried by leaving a bottle open in an atmospheric glove box with <0.1 ppm $O_2$ and <0.5 ppm $H_2O$. All manipulations were carried out inside of this box. A catalyst solution was prepared by dissolving 1.03 g of tributylphosphine oxide in 0.97 g of tetrahydrafuran. To this was added 2.19 g of a chloroplatinic acid complex of divinyltetramethyldisiloxane diluted with dimethylvinylsiloxy endblocked polydimethylsiloxane to provide a platinum concentration of 4.21 wt % platinum.

An adhesive was prepared by heating 20.10 g of the resin described in Preparation Example 1 to 120° C. and mixing with 1.39 g of trimethylsiloxy terminated dimethylsiloxymethylhydrogensiloxy copolymer with a viscosity of 5 mm$^2$/s and 0.76 wt % hydrogen bonded to silicon. After cooling to about 30° C., 0.05 g of the inhibited catalyst prepared above was added and mixed with a spatula. The dynamic viscosity of the pre-cured formulation was about 14 Pas at 1 Hz. The adhesive was stable in the absence of air for greater than eleven months. Cure commenced upon exposure to air. After about 5 minutes the adhesive was a tacky material with sufficient green strength to support the adherands on its own. After about two hours the material had cured.

EXAMPLES 2–3

Adhesives were prepared as described in Example 1, except the deoxygenation atmosphere contained 0.03 ppm $O_2$. The amount of each component employed is given in Table 1.

TABLE 1

| Adhesive Formulations Examples 1–3 | | | |
|---|---|---|---|
| Amount (g) | Example 1 | Example 2 | Example 3 |
| Resin | 20.10 | 18.02 | 16.59 |
| SiH Copolymer | 1.39 | 0.66 | 0.73 |
| Si(OSiMe$_2$H)$_4$ | 0 | 1.66 | 1.83 |
| Pt Catalyst | 0.05 | 0.04 | 0.04 |

To test the adhesive strength, aluminum lap shear test specimens were prepared by two different processes. The adherands were coated with a thin layer of uncured adhesive in the glove box. In the first method, the closed method, the adherands were bonded together with a 1"×1" overlap inside the glove box and then exposed to the atmosphere and allowed to cure. In the second method, the open method, the adherands were exposed to air for 9 minutes and then they were bonded together with a 1"×1" overlap. The lap shear strength as a function of time are given in Table 2.

TABLE 2

| | | | Lap Shear Tests | | | | |
|---|---|---|---|---|---|---|---|
| Example | Test Method | Bond (mm) | 30 min (psi) | 60 min (psi) | 180 min (psi) | 1440 min (psi) | % Cohesive (1440 min) |
| 1 | Closed | 0.2 | 0 | 2.1 | 29 | 240 | 85 |
| 2 | Closed | 0.05 | 0.8 | 18 | 42 | 210 | 75 |
| 3 | Open | 0.05 | 3.6 | 74 | 162 | 227 | 80 |

EXAMPLES 4–14

A resin stock solution was prepared as follows: To 649.2 g of the resin solution prepared in Preparation Example 2 was added 134.34 g of a vinyldimethylsiloxy terminated polydimethylsiloxane with a viscosity of 55,000 mm$^2$/s and 0.088 wt % vinyl. Most of the xylene was removed by heating under vacuum and 10.61 g of a trimethylsiloxy terminated dimethylsiloxymethylhydrogensiloxy copolymer with a viscosity of 5 mm$^2$/s and 0.76 wt % hydrogen bonded to silicon was added. Stripping was completed by heating to a pot temperature of 160° C. at 2 mm Hg.

This resin stock was weighed into small jars by heating to 120° C. under air to facilitate pouring. To the resin stock aliquots was added an amount (see Table 3) of vinyldimethylsiloxy terminated polydimethyl siloxane with a viscosity of 55,000 mm²/s and 0.088 wt % vinyl and an amount (see Table 3) of $Si(OSiMe_2H)_4$. The blends were mixed with a spatula at 120° C. and placed open in the dry box to remove oxygen. After three days, an amount of the platinum catalyst of Example 1 was added and mixed in at room temperature to give 99 ppm by weight of platinum.

TABLE 3

Adhesive Formulations Examples 4–14

| Example | Resin Stock (g) | Vi-Polymer (g) | $Si(OSiMe_2H)_4$ (g) | % Resin | SiH/Vi | Viscosity (Pas) |
|---|---|---|---|---|---|---|
| 4 | 24.30 | 2.50 | 0.30 | 68.63 | 1.0 | 1551 |
| 5 | 23.31 | 6.12 | 0.30 | 60.01 | 1.0 | 83.7 |
| 6 | 20.51 | 4.93 | 0.73 | 59.99 | 2.0 | 68.8 |
| 7 | 22.10 | 6.06 | 0.03 | 60.00 | 0.5 | 103.4 |
| 8 | 21.81 | 5.24 | 0.78 | 59.99 | 2.0 | 60.5 |
| 9 | 23.32 | 8.29 | 0.84 | 55.01 | 2.0 | 34.2 |
| 10 | 22.01 | 7.83 | 0.80 | 54.99 | 2.0 | 35.4 |
| 11 | 22.82 | 8.63 | 0.30 | 55.01 | 1.0 | 50.4 |
| 12 | 21.89 | 8.53 | 0.04 | 55.00 | 0.5 | 54.3 |
| 13 | 25.20 | 4.16 | 0.32 | 64.98 | 1.0 | 311.9 |
| 14 | 20.61 | 3.60 | 0.88 | 62.77 | 2.0 | 107.2 |

Aluminum lap shear test specimens were prepared using the closed method described in Examples 3–4. Slabs for tensile testing were also prepared and allowed to age for two weeks before testing. Results are given Table 4.

TABLE 4

Lap Shear and Tensile Test Results - Examples 4–14

| Example | Snap (min) | Lap Shear (psi) at Time (h) | | | | | | 14 Day Tensile Properties | |
|---|---|---|---|---|---|---|---|---|---|
| | | .50 | 1 | 2 | 4 | 24 | 48 | Tensile (psi) | Elong |
| 4 | | | | | | | | | |
| 5 | <10 | 0 | 1 | 6 | 9 | 48 | 56 | 37 | 1450 |
| 6 | <10 | 2 | 7 | 11 | 28 | 57 | 108 | 53 | 843 |
| 7 | 25 | 0.4 | 1 | 6 | 8 | 12 | 9 | Too sticky and soft to remove from die | |
| 8 | <10 | 7 | 8 | — | 18 | — | 58 | 26 | 605 |
| 9 | 13 | 2 | 9 | 17 | 53 | 98 | 105 | 61 | 703 |
| 10 | 7 | 1 | 10 | — | 23 | — | 72 | 31 | 710 |
| 11 | 11 | 0 | 2 | 20 | 28 | 41 | 45 | 23 | 1460 |
| 12 | 20 | 0 | 1 | 11 | 23 | 13 | 15 | 17 | 1076 |
| 13 | — | 2 | 6 | 13 | 23 | 80 | — | Sample tacky, tests not completed | |
| 14 | — | 1.5 | 5 | 10 | 20 | 43 | — | Foam - tests not completed | |

EXAMPLES 15–21

A resin stock solution was prepared as follows: To 673.7 g of the resin prepared in Preparation Example 3 was added 181.25 g of a vinyldimethylsiloxy terminated polydimethylsiloxane with a viscosity of 55,000 mm²/s and 0.088 wt % vinyl. Most of the xylene was removed by heating under vacuum and 9.44 g of a trimethylsiloxy terminated dimethylsiloxymethylhydrogensiloxy copolymer with a viscosity of 5 mm²/s and 0.76 wt % hydrogen bonded to silicon was added. Stripping was completed by heating to a pot temperature of 160° C. at 2 mm Hg.

This material was weighed into small jars by heating to 120° C. under air to facilitate pouring. To the resin stock aliquots was added an amount (see Table 5) of vinyldimethylsiloxy terminated polydimethyl siloxane with a viscosity of 55,000 mm²/s and 0.088 wt % vinyl and various amounts (see Table 5) of Si(OSiMe₂H)₄. The blends were mixed with a spatula at 120° C. and placed open in the dry box to remove oxygen. After three days, an amount of the platinum catalyst of Example 1 was added and mixed in at room temperature to give 99 ppm by weight of platinum.

TABLE 5

Adhesive Formulations - Examples 15–21

| Example | Resin Stock (g) | Vi-Polymer (g) | Si(OSiMe₂H)₄ (g) | % Resin | SiH/Vi |
|---|---|---|---|---|---|
| 15 | 25.14 | 2.41 | 1.67 | 60.24 | 2.0 |
| 16 | 25.75 | 3.43 | 0.74 | 60.24 | 1.0 |
| 17 | 25.88 | 3.93 | 0.26 | 60.25 | 0.5 |
| 18 | 25.15 | 0.17 | 1.66 | 65.25 | 2.0 |
| 19 | 25.29 | 5.08 | 1.69 | 55.22 | 2.0 |
| 20 | 25.34 | 6.05 | 0.74 | 55.22 | 1.0 |
| 21 | 25.30 | 6.51 | 0.26 | 55.23 | 0.5 |

Aluminum lap shear test specimens were prepared using the closed method described in Examples 3–4. Slabs for tensile testing were also prepared and allowed to age for two weeks before testing. Results are given Table 6.

TABLE 6

Lap Shear and Tensile Test Results - Examples 15–21

| Example | Snap (min) | Lap Shear (psi) at Time (hr) | | | | | 14 Day Elongation Properties | |
|---|---|---|---|---|---|---|---|---|
| | | .50 | 1 | 2 | 4 | 24 | 48 | Tensile (psi) | Elong |
| 15 | — | 4 | — | 18 | 23 | — | 98 | Rigid Foam | |
| 16 | — | — | 5 | 13 | 24 | 109 | 137 | 69 | 990 |
| 17 | — | 2 | — | 12 | 26 | — | — | — | — |
| 18 | — | 8 | — | — | 41 | 70 | 75 | 52 | 179 |
| 19 | — | — | 6 | 14 | 18 | 68 | 58 | Rigid Foam | |
| 20 | — | — | 5 | 10 | 14 | 61 | 81 | 94 | 218 |
| 21 | — | — | 0 | — | — | 45 | 66 | — | — |

EXAMPLE 22

An adhesive was prepared by heating 32.20 g of the resin described in Preparation Example 1 to 120° C. and mixing with 2.2 g of a trimethylsiloxy terminated dimethylsiloxymethylhydrogensiloxy copolymer with viscosity of 5 mm²/s and 0.76 wt % hydrogen bonded to silicon. The mixture was allowed to cool to room temperature. The dynamic viscosity measured at 1 Hz was about 14 Pas at 20° C. To this was added 0.09 g of a chloroplatinic acid complex of divinyltetramethyldisiloxane diluted with dimethylvinylsiloxy endblocked polydimethylsiloxane to provide a platinum concentration of 4.21 wt % which was then mixed in with a spatula. After about 4 minutes the adhesive was a tacky material with sufficient green strength to support the adherands on its own. After about 30 minutes the adherands could no longer be moved. The material had cured.

EXAMPLE 23

A resin stock solution was prepared as follows. To 1231.7 g of the resin solution of Preparation Example 4 was added 531.1 g of a vinyldimethylsiloxy terminated polydimethylsiloxane with a viscosity of 55,000 mm²/s and 0.088 weigh percent vinyl. The xylene was removed by heating under vacuum to 160° C. at 2 mm Hg.

20.03 g of the resin stock was weighed into small glass jar by heating to 120° C. under air in order that the material could be poured. To this resin stock aliquots was added 2.27 g vinyldimethylsiloxy terminated polydimethylsiloxane with a viscosity of 55,000 mm²/s and 0.088 wt % vinyl and 3.06 g of a copolymer comprised of $SiO_2$ units and $HMe_2SiO_{1/2}$ units in the ratio of 1.82 $HMe_2SiO_{1/2}$ units for every $SiO_2$ unit and having a viscosity of 24 mm²/s and one wt % hydrogen bonded to silicon. This produced composition 23-A.

20.02 g of the resin stock was weighed into small glass jar by heating to 120° C. under air in order that the material could be poured. To this resin stock aliquot was added 5.33 g vinyldimethylsiloxy terminated polydimethylsiloxane with a viscosity of 55,000 mm²/s and 0.088 wt % vinyl and 0.060 g platinum catalyst containing 4.2 wt % of platinum. This produced composition 23-B.

Aluminum lap shear test specimens with a 1"×1" overlap and 0.05 mm bondline were prepared using a two part static mixer which delivered equal volumes of the two parts (23-A and 23-B). Results of the lap shear tests are given in Table 7.

TABLE 7

Results of lap shear testing - Example 23

| Time (h) | 0.25 | 0.50 | 0.75 | 1.0 | 48 | 336 |
|---|---|---|---|---|---|---|
| Adhesive Strength (psi) | 25 | 77 | 88 | 143 | 128 | 287 |

EXAMPLE 24

20.13 g of the resin stock prepared in Example 23 was weighed into a small glass jar by heating to 120° C. under air in order that the material could be poured. To this resin stock aliquot was added 2.28 g vinyldimethylsiloxy terminated polydimethylsiloxane with a viscosity of 55,000 mm²/s and 0.088 wt % vinyl; 3.07 g of a copolymer comprised of $SiO_2$ units and $HMe_2SiO_{1/2}$ units in the ratio of 1.82 $HMe_2SiO_{1/2}$ units for every $SiO_2$ unit and having a viscosity of 24 mm²/s and one wt % hydrogen bonded to silicon; 0.60 g of Si(OCH₂CH₃)₄; and 0.12 g of methacryloxypropyltrimethoxysilane. This produced composition 24-A.

20.01 g of the resin stock prepared in Example 23 was weighed into small glass jar by heating to 120° C. under air in order that the material could be poured. To this resin stock aliquot was added 5.34 g vinyldimethylsiloxy terminated polydimethylsiloxane with a viscosity of 55,000 mm²/s and 0.088 wt % vinyl; 0.051 g of tetrabutyltitinate, Ti(OBu)₄; 0.038 g of trimethylolpropane diallyl ether and 0.061 g platinum catalyst containing 4.2 wt % of platinum. This produced composition 24-B.

Aluminum lap shear test specimens with a 1"×1" overlap and 0.05 mm bondline were prepared using a two part static mixer which delivers equal volumes of the two parts (24-A and 24-B). Results of the lap shear tests are given in Table 8.

TABLE 8

Lap Shear Test results for Example 24

| Time (h) | 0.25 | 0.50 | 0.75 | 1.0 | 2.0 | 48 | 336 |
|---|---|---|---|---|---|---|---|
| Adhesive Strength (psi) | 1.5 | 48 | 53 | 78 | 86 | 281 | 492 |
| % Cohesive Failure | 100 | 5 | 10 | 0 | 0 | 0 | 0 |

EXAMPLES 25–33

Additional two part compositions were prepared as in Example 24 using various amounts of components shown in Table 9. For these Examples $M(H)_{1.82}Q$ is a copolymer comprised of the $SiO_2$ units and $HMe_2SiO_{1/2}$ units in the ratio of 1.82 $HMe_2SiO_{1/2}$ units for every $SiO_2$ unit and having a viscosity of 24 mm²/s and one wt % hydrogen bonded to silicon and Adhesion Promoter 1 is a product derived from the reaction of ethylene glycol and tetraethylorthosilicate. Aluminum lap shear test specimens with a 1"×1" overlap and 0.05 mm bondline were prepared using a two part static mixer which delivered equal volumes of the two parts (A and B). Results of the lap shear tests are given in Table 10.

ity of 55,000 mm²/s and 0.088 wt % vinyl to 500 g of a 74.2 wt % xylene solution of an MQ resin (M/Q=0.7) containing 3.5 wt % silanol. The xylene was removed by heating the mixture under vacuum to 160° C. at 2 mm Hg.

Two part compositions were prepared by weighing the resin stock (See Table 11) into small glass jars by heating to 120° C. under air in order to facilitate pouring of the resin stock. To these resin stock aliquots was added (See Table 11) additional vinyldimethylsiloxy terminated polydimethylsiloxane with a viscosity of 55,000 mm²/s and 0.088 wt % vinyl, a copolymer comprised of $SiO_2$ units and $HMe_2SiO_{1/2}$ units in the ratio of 1.82 $HMe_2SiO_{1/2}$ units for every $SiO_2$ unit and having a viscosity of 24 mm²/s and one wt % hydrogen bonded to silicon and a platinum catalyst containing 4.2 wt % platinum. The blends were mixed with a spatula at 80° C.

TABLE 9

Formulations for compositions - Examples 25–33

| Example | Wt Resin (A) | Wt Vi Polymer (A) | Wt Resin (B) | Wt Vi Polymer (B) | Wt $M(H)_{1.82}Q$ (A) | Wt Pt (B) | Wt Adhesion Promoter 1 (B) | Wt Ti(OBu)₄ (B) |
|---|---|---|---|---|---|---|---|---|
| 25 | 14.02 | 8.28 | 14.04 | 11.35 | 3.06 | 0.061 | 0.761 | 0.051 |
| 26 | 14.01 | 6.85 | 14.01 | 11.43 | 4.58 | 0.061 | 0.765 | 0.051 |
| 27 | 14.01 | 9.91 | 14.09 | 11.48 | 1.54 | 0.059 | 0.769 | 0.051 |
| 28 | 14.04 | 6.02 | 14.04 | 8.08 | 4.59 | 0.050 | 0.665 | 0.044 |
| 29 | 20.99 | 12.55 | 21.00 | 17.13 | 4.58 | 0.091 | 0.764 | 0.076 |
| 30 | 14.01 | 9.39 | 14.04 | 10.75 | 3.06 | 0.061 | 1.491 | 0.124 |
| 31 | 14.04 | 8.39 | 14.04 | 11.46 | 3.07 | 0.061 | 0.767 | 0.128 |
| 32 | 14.00 | 8.37 | 14.03 | 11.44 | 3.06 | 0.061 | 1.532 | 0.051 |
| 33 | 14.07 | 8.41 | 14.04 | 11.46 | 3.07 | 0.061 | 0.511 | 0.128 |

TABLE 10

Lap Shear Results - Examples 25–33

Aluminum Lap Shear psi (% Cohesive Failure)

| Example | 15 min | 30 min | 45 min | 1 hr | 2 hr | 2 days | 2 weeks |
|---|---|---|---|---|---|---|---|
| 25 | 20 | 74 | 86 | 116 | 201 | 492 | 644 |
|  | (100) | (0) | (20) | (0) | (0) | (0) | (33) |
| 26 | 42 | 116 | 162 | 173 | 198 | 411 | 713 |
|  | (0) | (20) | (0) | (0) | (0) | (0) | (50) |
| 27 | 11 | 43 | 84 | 50 | 94 | 245 | 279 |
|  | (100) | (0) | (0) | (0) | (0) | (0) | (0) |
| 28 | 11 | 146 | 178 | 278 | 247 | 401 | 703 |
|  | (75) | (0) | (0) | (0) | (0) | (0) | (80) |
| 29 | 20 | 69 | 73 | 99 | 136 | 340 | 489 |
|  | (0) | (0) | (0) | (0) | (0) | (0) | (0) |
| 30 | 46 | 61 | 182 | 120 | 89 | 407 | 578 |
|  | (20) | (0) | (0) | (5) | (10) | (0) | (5) |
| 31 | 22 | 79 | 100 | 102 | 123 | 454 | 535 |
|  | (0) | (0) | (0) | (0) | (0) | (0) | (0) |
| 32 | 24 | 79 | 91 | 102 | 187 | 463 | 486 |
|  | (0) | (0) | (0) | (0) | (0) | (0) | (0) |
| 33 | 13 | 58 | 99 | 68 | 73 | 290 | 467 |
|  | (100) | (0) | (0) | (0) | (0) | (0) | (0) |

TABLE 11

Formulations for the Comparison Examples

| Comparison Examples | Resin Stock (g) | Vi-Polymer (g) | Pt (g) | SiH Polymer (g) |
|---|---|---|---|---|
| C1-A | 75 | 7.97 | 0.00 | 0.37 |
| C1-B | 75 | 8.16 | 0.17 | 0.00 |
| C2-A | 75 | 18.3 | 0.00 | 0.45 |
| C2-B | 75 | 18.55 | 0.20 | 0.00 |
| C3-A | 75 | 7.75 | 0.00 | 0.58 |
| C4-A | 75 | 18.03 | 0.00 | 0.72 |

Comparison Example

A resin stock was prepared by adding 731 g of a vinyldimethylsiloxy terminated polydimethylsiloxane with a viscos- Lap shear test specimens were prepared as in the previous examples by combining corresponding parts A and B. Lap shear results are found in Table 12. As can be seen from the results in Table 12, that following the initial cure to the tacky adhesive the compositions did not further cure to higher lap shear strengths.

TABLE 12

Lap Shear Results for Comparison Examples

| A | B | % Resin | ppm Pt | SiH/Vi | Aluminum Lap Shear (psi) | | | | |
|---|---|---------|--------|--------|--------|--------|---------|---------|----------|
|   |   |         |        |        | 15 min | 1 hour | 2 hours | 4 hours | 24 hours |
| C1-A | C1-B | 45 | 25 | 1.25 | 13 | 26 | 59 | 49 | 43 |
| C2-A | C2-B | 40 | 25 | 1.25 | 34 | 52 | 70 | 59 | 43 |
| C3-A | C1-B | 45 | 25 | 2.00 | 43 | 59 | 79 | 72 | 65 |
| C4-A | C2-B | 40 | 25 | 2.00 | 59 | 55 | 63 | 61 | 38 |

What is claimed is:

1. An addition-curable silicone adhesive comprising a mixture of
   (A) 55 to 95 parts of an alkenyl functional siloxane resin consisting essentially of $R_3SiO_{1/2}$ siloxane units and $SiO_{4/2}$ siloxane units, wherein each R is independently a monovalent hydrocarbon radical having 1 to 6 carbon atoms with the provision that at least one R group be an alkenyl radical; there being from 0.5 to 1.5 $R_3SiO_{1/2}$ units for every $SiO_{4/2}$ units; said resin containing 0.6 to 22 wt % alkenyl functionality;
   (B) 0.5 to 10 parts of an SiH containing polyorganosiloxane having an average of at least 2 silicon-bonded hydrogen atoms per molecule and having a viscosity of 0.8 to 2,000 $mm^2/s$;
   (C) a hydrosilylation catalyst in sufficient quantity to promote curing of said composition; and
   (D) 0.1 to 70 parts of a polydiorganosiloxane having at least two ethylenically or acetylenicaly unsaturated groups per molecule and having a viscosity of 100 to 80,000 $mm^2/s$; or any reaction product thereof;
   wherein said adhesive composition has a viscosity of between 5 and 1,500 Pas at 25° C. in the absence of solvent; and
   wherein said adhesive composition first cures at room temperature to a composition having green strength and a movable bond and thereafter further cures at room temperature to a composition having an immovable bond.

2. The composition as claimed in claim 1 further containing an inhibitor in sufficient quantity for the composition to be stable at room temperature in the absence of oxygen and SiH reactive hydroxylated compounds.

3. The composition as claimed in claim 1 wherein the siloxane resin (A) contains from 0.6 to 8 wt % alkenyl functionality.

4. The composition as claimed in claim 1 wherein in siloxane resin (A) the alkenyl functionality is vinyl and the remaining R groups are methyl.

5. The composition as claimed in claim 1 wherein the siloxane resin (A) contains from 0.6 to 1.1 $R_3SiO_{1/2}$ siloxane units to $SiO_{4/2}$ units.

6. The composition as claimed in claim 1 where the viscosity of the SiH containing polyorganosiloxane is from 2 to 200 $mm^2/s$.

7. The composition as claimed in claim 1 wherein the SiH containing polyorganosiloxane (B) is selected from the group consisting of $R^2_3SiO(R^1_2SiO)_{1/2}(HR^1SiO)_nSiR^2_3$ $R^2_3SiO(R^2_2SiO)_pSiR^2_3$ $(R^1_2Si)_s(HR^1SiO)_t$ and

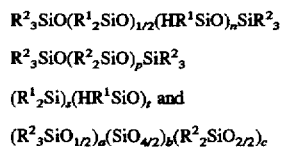

wherein each $R^1$ individually is a radical selected from the group consisting of alkyl radicals having from 1 to 6 carbon atoms and aryl radicals having from 6 to 10 carbons atoms; $R^2$ is selected from the group consisting of the hydrogen atom and $R^1$ with the proviso that at least two $R^2$ groups are hydrogen atoms; subscripts m, n, p, s, t, a, b, and c are such that the viscosity is from 0.8 to 2,000 $mm^2/s$ and that, individually, n, p, t and a+c are $\geq 2$.

8. The composition as claimed in claim 1 wherein the hydrosilylation catalyst is a platinum-containing catalyst.

9. The composition as claimed in claim 8 wherein the catalyst is present in an amount to provide from 0.1 to 1000 ppm of platinum.

10. The composition as claimed in claim 1 wherein polydiorganosiloxane (D) is an alkenyl functional polydiorganosiloxane having the general formula $R^1_2R^3SiO$ $(R^3_2SiO)_kSiR^3R^1_2$ wherein each $R^1$ is individually a radical selected from the group consisting of alkyl radicals having from 1 to 6 carbon atoms and aryl radicals having from 6 to 10 carbons atoms; each $R^3$ individually is selected from the group consisting of an alkenyl radical, an alkynyl radical and $R^1$ with the proviso that at least two $R^3$ radicals per molecule must be alkenyl or alkynyl; and subscript k has a value such that the viscosity of the polydiorganosiloxane is from 100 to 80,000 centistoke at 25° C.

11. The composition as claimed in claim 10 wherein the viscosity of polydiorganosiloxane (D) is from 9,000 to 55,000 $mm^2/s$.

12. The composition as claimed in claim 10 wherein $R^1$ is methyl.

13. The composition as claimed in claim 1 wherein there is from 1 to 50 parts of the alkenyl functional polydiorganosiloxane.

14. The composition as claimed in claim 1 wherein the inhibitor is an organophosphorus compound.

15. The composition as claimed in claim 2 wherein the inhibitor is present in an amount to provide a mole ratio of inhibitor to metal in the hydrosilylation catalyst of 1:1 to 200:1.

16. A one part addition-curable silicone adhesive composition comprising a mixture of
   (A) 55 to 95 parts of an alkenyl functional siloxane resin consisting essentially of $R_3SiO_{1/2}$ siloxane units and $SiO_{4/2}$ siloxane units, wherein each R is independently a monovalent hydrocarbon radical having 1 to 6 carbon atoms with the provision that at least one R group be an alkenyl radical; there being from 0.5 to 1.5 $R_3SiO_{1/2}$ units for every $SiO_{4/2}$ units; said resin containing 0.6 to 22 wt % alkenyl functionality;
   (B) 0.5 to 10 parts of an SiH containing polyorganosiloxane having an average of at least 2 silicon-bonded hydrogen atoms per molecule and having a viscosity of 0.8 to 2,000 $mm^2/s$; and
   (C) a hydrosilylation catalyst in sufficient quantity to promote curing of said composition;

(D) 0.1 to 70 parts of a polydiorganosiloxane having at least two ethylenically or acetylenicaly unsaturated groups per molecule and having a viscosity of 100 to 80,000 mm$^2$/s; and (E) an inhibitor in sufficient quantity for the composition to be stable at room temperature;

wherein said adhesive composition has a viscosity of between 5 and 1,500 Pas at 25° C. in the absence of solvent; and wherein said adhesive composition first cures at room temperature to a composition having green strength and a movable bond and thereafter further cures at room temperature to a composition having an immovable bond.

17. A two part addition-curable silicone adhesive composition comprising a mixture of (A) 55 to 95 parts of an alkenyl functional siloxane resin consisting essentially of $R_3SiO_{1/2}$ siloxane units and $SiO_{4/2}$ siloxane units, wherein each R is independently a monovalent hydrocarbon radical having 1 to 6 carbon atoms with the provision that at least one R group be an alkenyl radical; there being from 0.5 to 1.5 $R_3SiO_{1/2}$ units for every $SiO_{4/2}$ units; said resin containing 0.6 to 22 wt % alkenyl functionality;

(B) 0.5 to 10 parts of an SiH containing polyorganosiloxane having an average of at least 2 silicon-bonded hydrogen atoms per molecule and having a viscosity of 0.8 to 2,000 mm$^2$/s; and (C) a hydrosilylation catalyst in sufficient quantity to promote curing of said composition;

(D) 0.1 to 70 parts of a polydiorganosiloxane having at least two ethylenically or acetylenicaly unsaturated groups per molecule and having a viscosity of 100 to 80,000 mm$^2$/s;

wherein the first part comprises components (A), (B) and (D) and the second part comprises (A), (C) and (D);

wherein said adhesive composition has a viscosity of between 5 and 1,500 Pas at 25° C. in the absence of solvent; and wherein said adhesive composition first cures at room temperature to a composition having green strength and a movable bond and thereafter further cures at room temperature to a composition having an immovable bond.

\* \* \* \* \*